(12) United States Patent
Campbell et al.

(10) Patent No.: US 11,824,252 B2
(45) Date of Patent: Nov. 21, 2023

(54) SMALL CELL ANTENNA STRAND MOUNTS AND ASSEMBLIES

(71) Applicant: CommScope Technologies LLC, Hickory, NC (US)

(72) Inventors: Robert Campbell, Irving, TX (US); Matthew Severin, Grapevine, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/582,481

(22) Filed: Jan. 24, 2022

(65) Prior Publication Data
US 2022/0255211 A1 Aug. 11, 2022

Related U.S. Application Data

(60) Provisional application No. 63/146,775, filed on Feb. 8, 2021.

(51) Int. Cl.
*H01Q 1/12* (2006.01)
*H02G 3/04* (2006.01)

(52) U.S. Cl.
CPC ............ *H01Q 1/12* (2013.01); *H02G 3/0456* (2013.01)

(58) Field of Classification Search
CPC .. H01Q 1/12; H01Q 1/14; H01Q 1/18; H01Q 1/2208; H01Q 1/24; H01Q 1/246
See application file for complete search history.

(56) References Cited

U.S. PATENT DOCUMENTS

| | | | | |
|---|---|---|---|---|
| 7,660,508 B2 * | 2/2010 | Mures | ............ | G02B 6/445 |
| | | | | 385/135 |
| 9,377,132 B2 * | 6/2016 | Bishop | ............ | G02B 6/483 |
| 9,705,177 B1 * | 7/2017 | Schmidt | ............ | H01Q 1/18 |
| 10,770,787 B2 * | 9/2020 | Pera | ............ | H01Q 1/523 |
| 11,053,702 B2 * | 7/2021 | Bucur | ............ | H04W 88/08 |
| 11,497,129 B2 * | 11/2022 | Severin | ............ | H05K 5/0204 |
| 11,658,763 B2 * | 5/2023 | Bolster | ............ | G02B 6/4455 |
| | | | | 398/79 |
| 2011/0309996 A1 * | 12/2011 | Abumrad | ............ | H01Q 1/42 |
| | | | | 343/872 |
| 2014/0118191 A1 * | 5/2014 | Smith | ............ | H01Q 3/242 |
| | | | | 342/372 |
| 2014/0313080 A1 * | 10/2014 | Smith | ............ | H01Q 19/28 |
| | | | | 342/368 |
| 2017/0214133 A1 * | 7/2017 | Orem | ............ | H01Q 1/1207 |
| 2019/0334622 A1 * | 10/2019 | Ho | ............ | H01Q 9/0421 |
| 2020/0099828 A1 * | 3/2020 | Dell'Aglio | ............ | H04N 23/54 |
| 2020/0350661 A1 * | 11/2020 | Alrutz | ............ | H01Q 21/205 |
| 2020/0358476 A1 * | 11/2020 | Chamberlain | ............ | H01Q 1/44 |
| 2021/0095464 A1 * | 4/2021 | Bucur | ............ | H04W 88/08 |
| 2021/0104807 A1 * | 4/2021 | Patel | ............ | E04H 12/2253 |

(Continued)

*Primary Examiner* — Jason Crawford
(74) *Attorney, Agent, or Firm* — Myers Bigel, P.A.

(57) ABSTRACT

The present disclosure describes a strand mount. The strand mount includes a hanging bracket configured to be secured to a cable strand, two or more mounting plates, each mounting plate configured such that a small cell antenna can be mounted thereto, and two or more transition brackets securing the two or more mounting plates to the hanging bracket. The transition brackets and mounting plates are adjustable to allow for directional and/or omni-directional mounting of the small cell antennas to the strand mount. Strand mount assemblies are also described herein.

20 Claims, 13 Drawing Sheets

(56) References Cited

U.S. PATENT DOCUMENTS

| | | | |
|---|---|---|---|
| 2021/0249762 A1* | 8/2021 | Severin | H01Q 1/42 |
| 2021/0289641 A1* | 9/2021 | Severin | F16M 13/02 |
| 2021/0408664 A1* | 12/2021 | Severin | H01Q 1/20 |
| 2022/0255211 A1* | 8/2022 | Campbell | H02G 3/0456 |
| 2023/0024613 A1* | 1/2023 | Arai | E02F 9/264 |

* cited by examiner

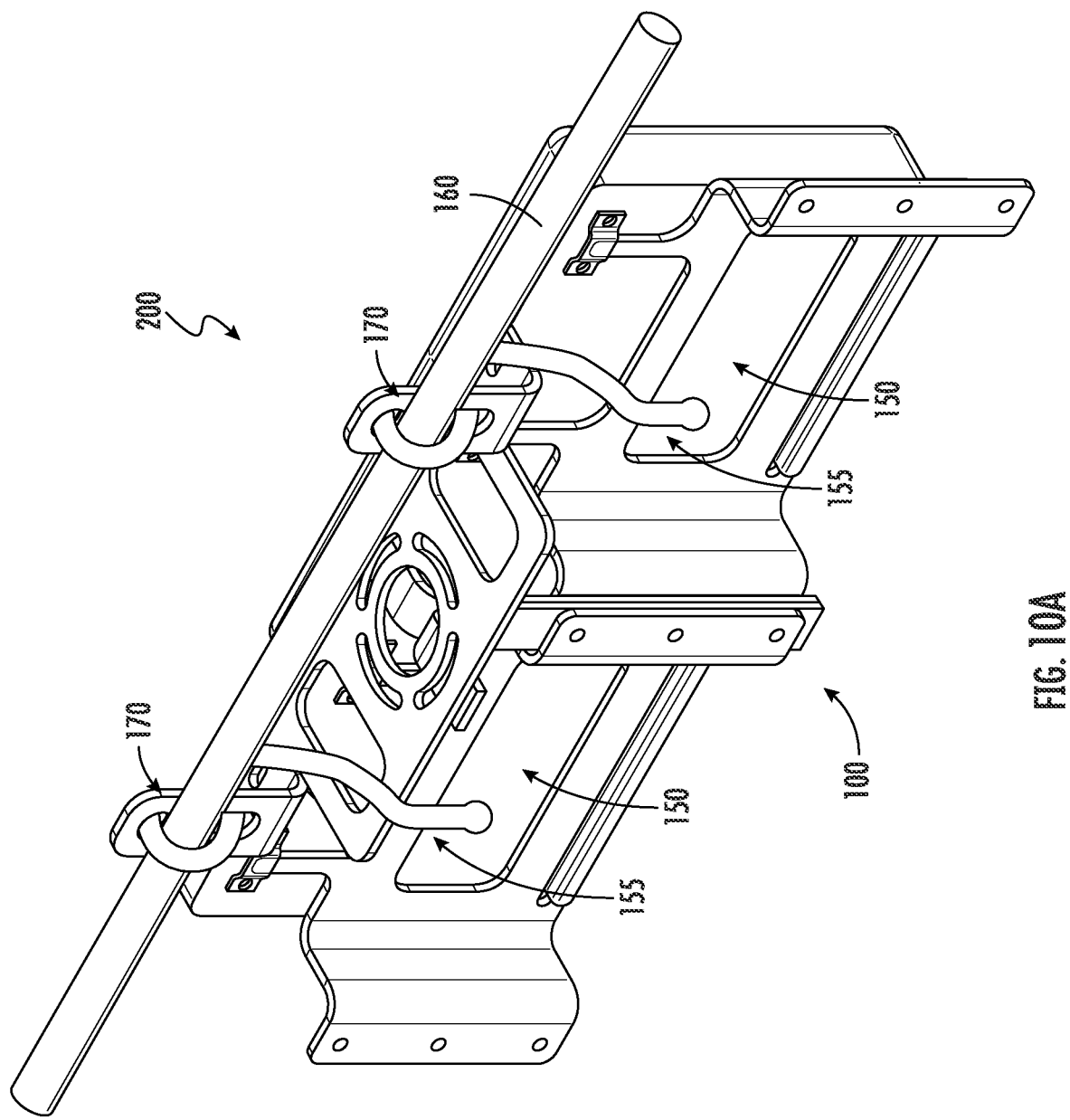

SMALL CELL ANTENNA STRAND MOUNTS AND ASSEMBLIES

RELATED APPLICATION(S)

The present application claims priority to and the benefit of U.S. Provisional Application Ser. No. 63/146,775, filed Feb. 8, 2021, the disclosure of which is hereby incorporated herein in its entirety.

FIELD

The present invention relates generally to telecommunications equipment, and more particularly, to small cell antenna mounts and small cell antenna mount assemblies.

BACKGROUND

Currently, very few strand mounts for telecommunications equipment, such as small cell antennas, exist. Strand mounts enable equipment to be mounted on cables, wires, or the like, that extend between utility poles (e.g., telephone or power poles). However, as small cell mounts, e.g., strand mounts, become increasing more popular, many municipalities are enacting strict mounting requirements. There may be a need for small cell antenna strand mounts that allow for directional and omni-directional mounting, while also meeting the mounting requirements set by the different municipalities.

SUMMARY

A first aspect of the present invention is directed to a strand mount. The strand mount may include a hanging bracket configured to be secured to a cable strand, two or more mounting plates, each mounting plate configured such that a small cell antenna can be mounted thereto, and two or more transition brackets securing the two or more mounting plates to the hanging bracket. The transition brackets and mounting plates are adjustable to allow for directional and/or omni-directional mounting of the small cell antennas to the strand mount.

Another aspect of the present invention is directed to a strand mount. The strand mount may include a hanging bracket, two or more mounting plates, and two or more transition brackets configured to secure the mounting plates to the hanging bracket. The hanging bracket may include a main body having a plurality of apertures. The plurality of apertures may include a plurality of elongated slots extending circumferentially around a central aperture. The hanging bracket may further include a pair of arm members configured to secure the strand mount to a cable strand, each arm member residing adjacent to opposing ends of the main body and bent perpendicularly to, and extending upwardly from, the main body. Each mounting plate may include a main body, a pair of flanged edges that extend outwardly from opposing sides of the main body, and a pair of mounting members that extend upwardly from the main body and configured to have a respective small cell antenna secured thereto. Each transition bracket may include a main body having one or more apertures positioned and configured to align with a corresponding aperture in a respective flanged edge of the mounting plate, and a flanged end coupled to and extending generally perpendicularly to the main body, the flanged end including an aperture configured to align with a respective elongated slot in the hanging bracket. The transition brackets and mounting plates may be adjustably secured to the hanging bracket to allow for directional and/or omni-directional mounting of the small cell antennas to the strand mount.

Another aspect of the present invention is directed to a strand mount assembly. The strand mount assembly may include a mounting structure, which may be a cable strand, one or more small cell antennas, and a stand mount. The strand mount may include a hanging bracket configured to be secured to the cable strand, two or more mounting plates, each mounting plate configured such that a respective small cell antenna can be mounted thereto, and two or more transition brackets securing the two or more mounting plates to the hanging bracket. Each of the small cell antennas are mounted to a respective mounting plate and the strand mount is mounted to the cable strand by the hanging bracket.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 10A and FIG. 10B illustrate strand mount assemblies according to embodiments of the present invention secured to a cable strand.

DETAILED DESCRIPTION

Figure 1:
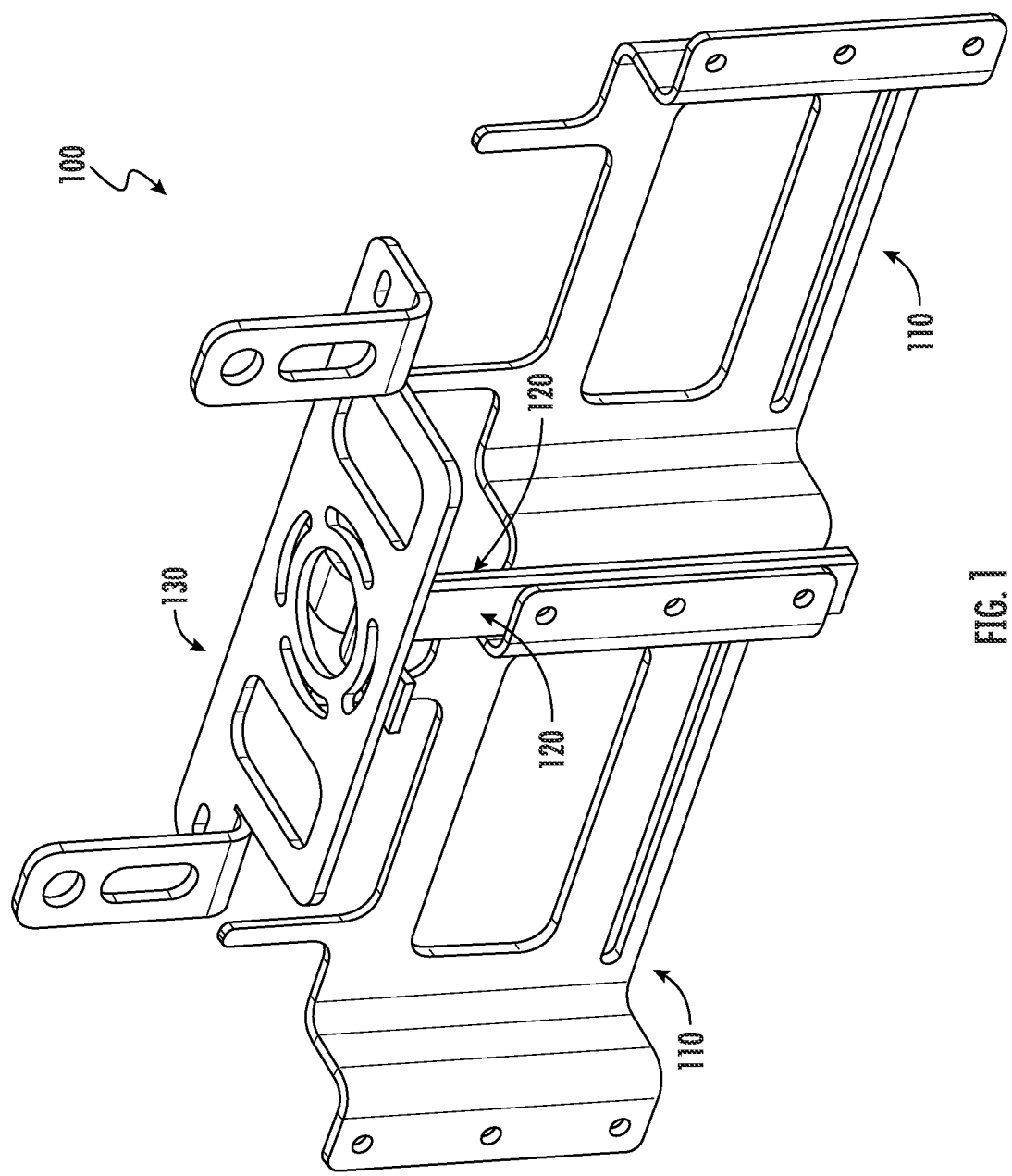
FIG. 1 is a perspective view of a strand mount according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Embodiments of the present invention will now be discussed in greater detail with reference to the drawings. In some cases, two-part reference numerals are used in the drawings. Herein, elements having such two-part references numerals may be referred to individually by their full reference numeral (e.g., transition bracket 120-1) and may be referred to collectively by the first part of their reference numerals (e.g., the transition brackets 120). Like numbers refer to like elements throughout and different embodiments of like elements can be designated using a different number of superscript indicator apostrophes (e.g., 100, 100', 100").

Referring now to FIGS. 1-10B, a strand mount according to embodiments of the present invention, designated broadly at 100, is illustrated. As discussed in further detail below, the strand mount 100 of the present invention may allow for directional and omni-directional mounting of small cell antennas, as well as provides the capability to rotate the mounted antennas 360 degrees for proper directional alignment.

Figure 2:
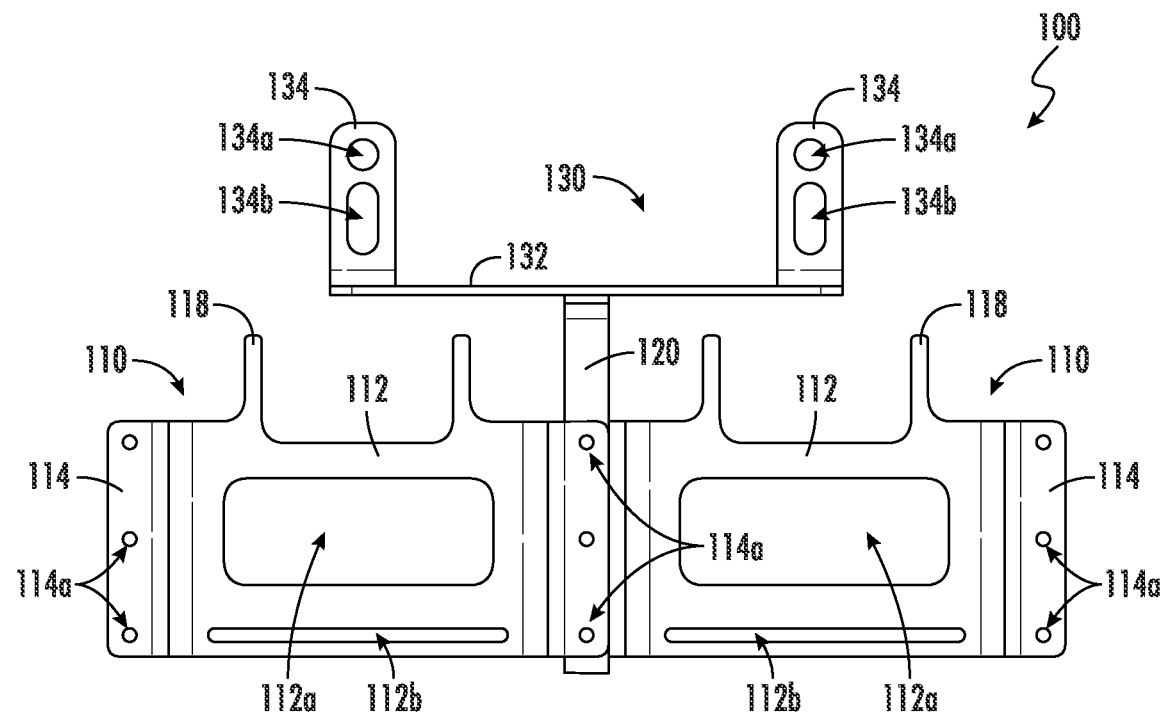
FIG. 2 is a front view of the strand mount of FIG. 1.
Figure 3:
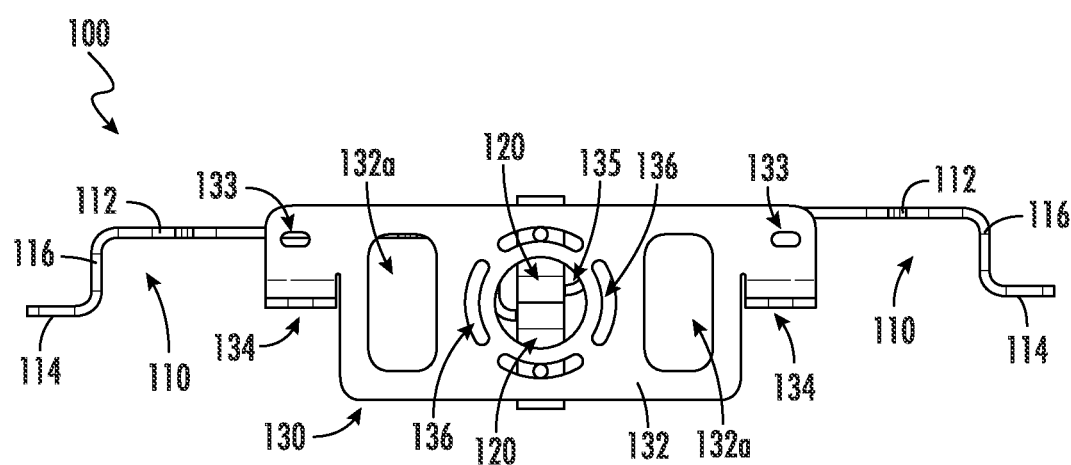
FIG. 3 is a top view of the strand mount of FIG. 1.
Figure 4:
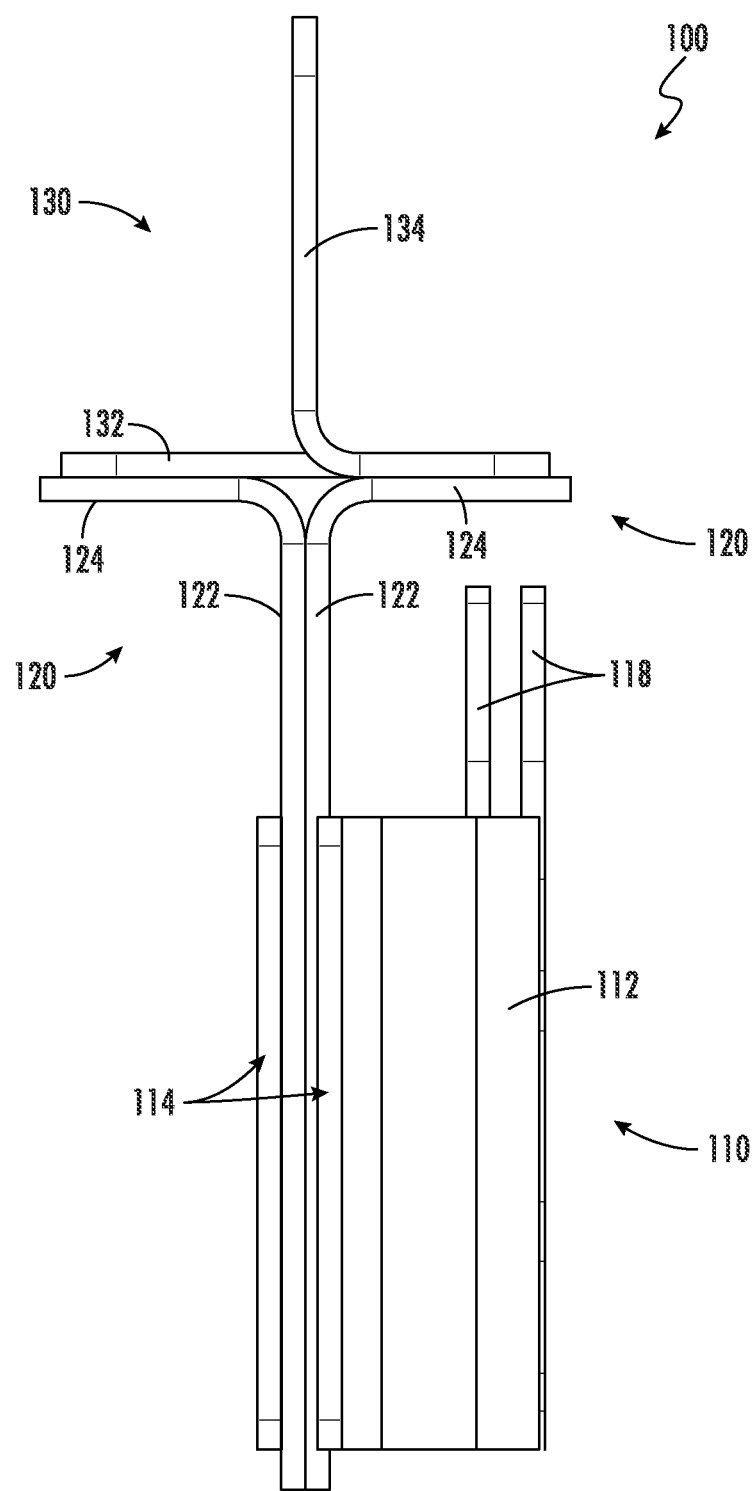
FIG. 4 is a side view of the strand mount of FIG. 1.
Figure 5:
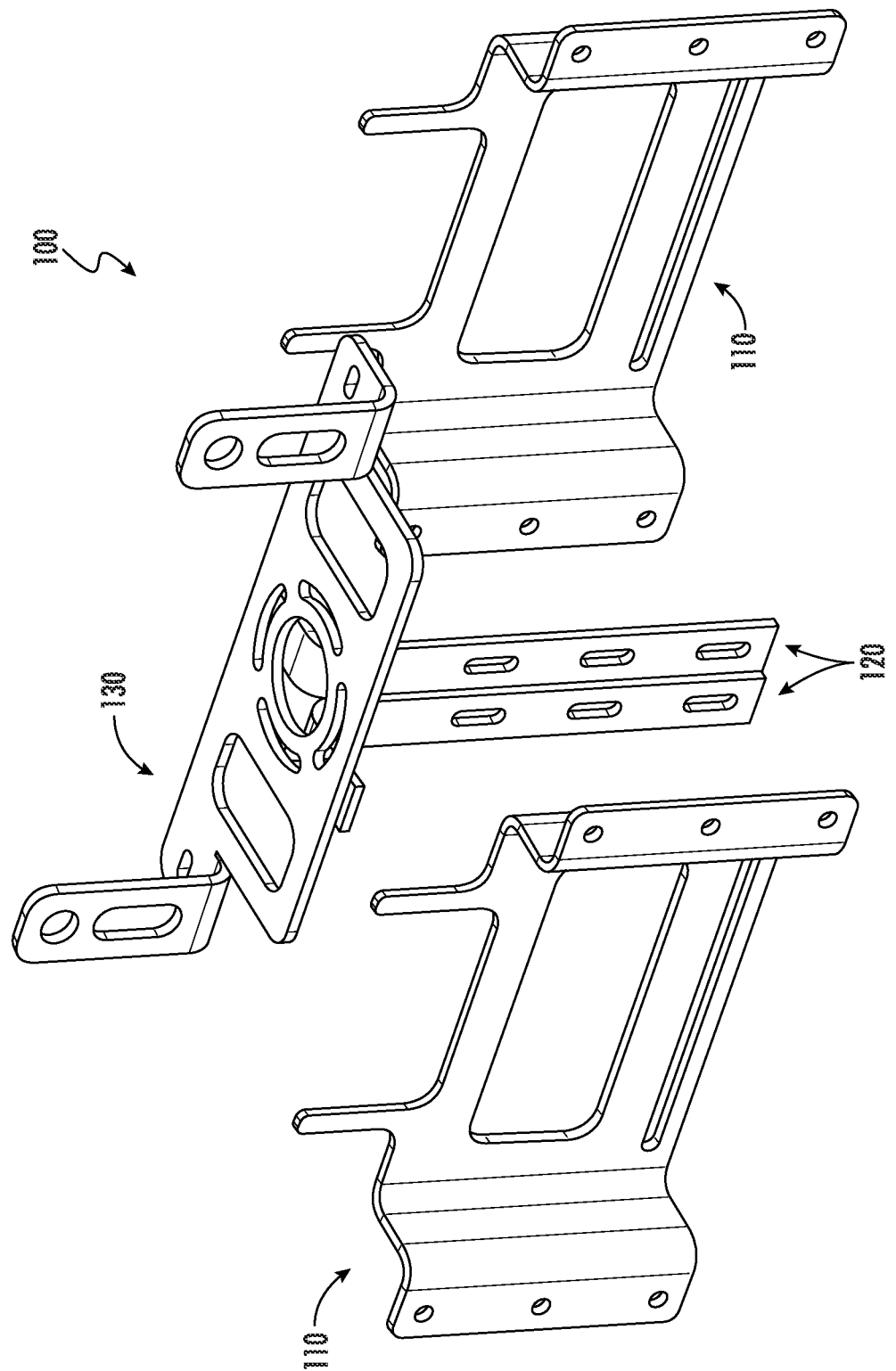
FIG. 5 is an exploded perspective view of the strand mount of FIG. 1.

As shown in FIGS. 1-5, in some embodiments, the strand mount 100 includes at least two mounting plates 110, at least two transition brackets 120, and a hanging bracket 130. In some embodiments, the strand mount 100 may include more than two mounting plates 110 and/or transition brackets 120 (see, e.g., FIGS. 9A-9B). In some embodiments, the transition brackets 120 may be formed as a unitary or monolithic member. FIG. 1 is a rear perspective view of the strand mount 100. FIG. 2 is a front view of the strand mount 100. FIG. 3 is a top view of the strand mount 100. FIG. 4 is a side view of the strand mount 100. FIG. 5 is an exploded view of the strand mount 100. The mounting plates 110 are coupled or secured to the hanging bracket 130 via the transition brackets 120. Each mounting plate 110 is configured such that an antenna 150 (e.g., a small cell antenna, see, e.g., FIG. 7A) may be mounted and secured thereon. The hanging bracket 130 is configured to hang (and secure) the strand mount 100 on a cable strand 160 (see, e.g., FIGS. 10A-10B). As discussed in further detail below, the transition brackets 120 are configured to secure the mounting plates 110 to the hanging bracket 130 in the desired configuration and alignment for the mounted antennas 150 (e.g., directional or omni-directional mounting of the antennas 150) (see, e.g., FIGS. 7A and 7B, FIG. 8B, FIG. 9B, and FIGS. 10A and 10B).

Figure 6A:
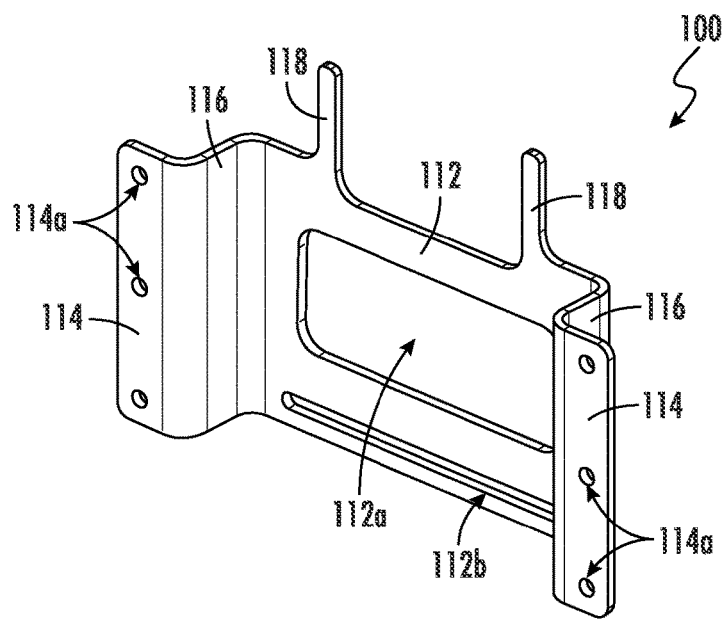
FIG. 6A is a perspective view of a mounting plate of the strand mount of FIG. 1.
Figure 6B:
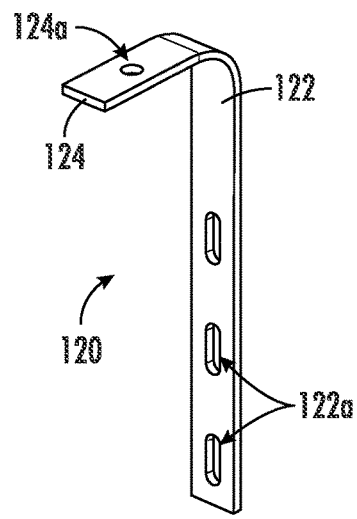
FIG. 6B is a perspective view of a transition bracket of the strand mount of FIG. 1.
Figure 6C:
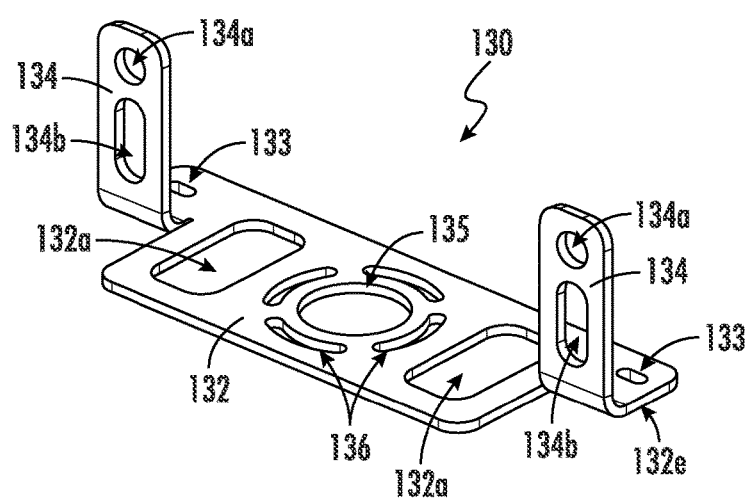
FIG. 6C is a perspective view of a hanging bracket of strand mount of FIG. 1.

Referring to FIGS. 6A-6C, one of the mounting plates 110 (FIG. 6A), one of the transition brackets 120 (FIG. 6B), and the hanging bracket 130 (FIG. 6C) of the strand mount 100 are individually illustrated. As shown in FIG. 6A, each mounting plate 110 includes a main body 112 and a pair of flanged edges 114. A pair of mounting members 118 extend upwardly from the main body 112 and provide locations to secure an antenna 150 to the mounting plate 110, for example, via mounting brackets 152 (see, e.g., FIG. 7B). The flanged edges 114 extend outwardly from opposing sides of the main body 112 of the mounting plate 110. Each flanged edge 114 comprises one or more apertures 114a. Each aperture 114a is sized and configured to receive a respective fastener (e.g., a bolt) (not shown) such that the mounting plate 110 may be secured to one or more transition brackets 120 (see, e.g., FIGS. 1, 2, 4, and 7A-9B), which will be discussed in further detail below. In some embodiments, the main body 112 and flanged edges 114 of the mounting plate 110 may be monolithic. For example, in some embodiments, the mounting plate 110 may be formed of a single piece of steel or aluminum, in which the main body 112 is bent at transition areas 116 to form the flanged edges 114 of the mounting plate 110.

In some embodiments, the main body 112 may also comprise one or more openings 112a, 112b. As shown in FIG. 6A, in some embodiments, one of the openings 112a may be sized and configured to allow access to the back of an antenna 150 that has been secured to the mounting plate 110. The opening 112a also allows cables 155 (e.g., power cables, telecommunications cables, etc.) to be routed from the back of the antenna 150 to corresponding cables extending parallel to the cable strand 160 (see, e.g., FIG. 7B and FIGS. 10A-10B). In some embodiments, the opening 112a may be generally rectangular in shape; however, the opening 112a may be any other shape that would be sufficient to allow access to the back of the antenna 150 such as square, circular, or elliptical.

In some embodiments, the main body 112 may further comprise a second opening 112b. As shown in FIG. 6A, the second opening 112b may be an elongated slot residing below the first (larger) opening 112a. In some embodiments, the second opening 112b may be sized and configured to receive a flange 151 that extends outwardly from the back of the antenna 150 (see, e.g., FIG. 7B). For example, in some embodiments, when an antenna 150 is secured to the mounting plate 110, the flange 151 extending from the antenna 150 may be received through the second slot-shaped opening 112b in the main body 112. The flange 151 may have a downwardly bent edge 151e that engages the main body 112 after inserted through opening 112b, thereby helping to secure the antenna 150 to the mounting plate 110, while also helping support the load weight of the antenna 150.

As shown in FIG. 6B, the transition bracket 120 is generally L-shaped, with a main body 122 and a flanged end 124. The flanged end 124 is coupled to and extends generally perpendicularly to the main body 122. In some embodiments, the main body 122 and flanged end 124 may be monolithic. For example, in some embodiments, the transition bracket 120 may be formed from a single piece of steel or aluminum and the main body 122 is bent to form the flanged end 124. The main body 122 may comprise one or more apertures 122a. Each of aperture 122a is positioned and configured to align with a corresponding aperture 114a in a respective flanged edge 114 of the mounting plate 110. In some embodiments, each of the apertures 122a in the transition bracket 120 may have an oblong shape to allow for easier alignment with a corresponding aperture 114a in the flanged edge 114 of the mounting plate 110. The mounting plate 110 and one or more transition brackets 120 are secured to together by inserting a fastener (e.g., a bolt) through their respective aligned apertures 114a, 122a.

Still referring to FIG. 6B, the flanged end 124 of the transition bracket 120 also comprises an aperture 124a. As discussed in further detail below, the aperture 124a in the flanged end 124 of the transition bracket 120 is sized and configured to receive a separate fastener (e.g., a bolt) that will secure the transition bracket 120 (and mounting plate 110) to the hanging bracket 130.

As shown in FIG. 6C, the hanging bracket 130 includes a main body 132 and a pair of arm members 134. The hanging bracket 130 is configured to secure (hang) the strand mount 100 to a cable strand 160 (see, e.g., FIGS. 10A-10B). Each arm member 134 is adjacent to an opposing end 132e of the main body 132 and is bent perpendicularly to, and extends upwardly from, the main body 132. Each arm member 134 may comprise one or more apertures 134a, 134b. Each aperture 134a, 134b may be sized and configured to receive a respective fastener, such as from a corresponding mounting clamp 170. For example, in some embodiments, a top member of the mounting clamp 170 may be secured to the hanging bracket 130 via a fastener (e.g., a bolt) received through the top aperture 134a and a bottom member of the mounting clamp 170 may be secured to the hanging bracket 130 via a separate fastener (e.g., a bolt) received through the bottom aperture 134b. In some embodiments, the bottom aperture 134b may have an oblong shape which allows the mounting clamp 170 to be adjustable, for example, to accommodate for different size cable strands 160 and to assist with balancing the strand mount 100 on the cable strand 160.

The main body 132 of the hanging bracket 130 further comprises a plurality of different apertures 132a, 133, 135, 136. First, as shown in FIG. 6C, a circular aperture 135 may be located in a medial section of the main body 132. The circular aperture 135 is sized and configured such that cables 155 may be routed therethrough. For example, cables 155 may be routed through aperture 135 when the strand mount 100 is configured for omni-directional mounting of antennas 150 (see, e.g., FIGS. 8A-8B). Next, four elongated apertures 136 extend circumferentially around the central circular aperture 135. As discussed in further detail below, the four elongated apertures 136 are sized and configured to receive a fastener (e.g., a bolt) to secure the transition bracket(s) 120 to the hanging bracket 130 (via aperture 124a). The positions of the elongated apertures 136 around the central aperture 135 also allows for 360 degrees of rotation for proper directional alignment of the mounted antennas 150.

A pair of routing apertures 132a each reside between the central aperture 135 (and elongated apertures 136) and a respective arm member 134. Each routing aperture 132a is sized and configured such that cables 155 may be routed therethrough. For example, cables 155 may be routed through routing apertures 132a when the strand mount 100 is configured for directional mounting of antennas 150 (see, e.g., FIGS. 7A-7B and FIGS. 9A-9B). In the figures, the routing apertures 132a are shown as being generally rectangular in shape but may have another shape sufficient to route cables 155 therethrough, such as square, circular, or elliptical.

Transition apertures 133 are located adjacent to opposing edges 132e of the main body 132 and rearwardly from a respective arm member 134. As discussed in further detail below, each transition aperture 133 is sized and configured to receive a fastener (e.g., a bolt) to secure a transition bracket 120 to the hanging bracket 130, i.e., via aperture 124a. For example, in some embodiments, the transition apertures 133 may be used when the strand mount 100 is oriented for omni-directional alignment of the mounted antennas 150 (see, e.g., FIGS. 8A-8B).

Figure 7A:
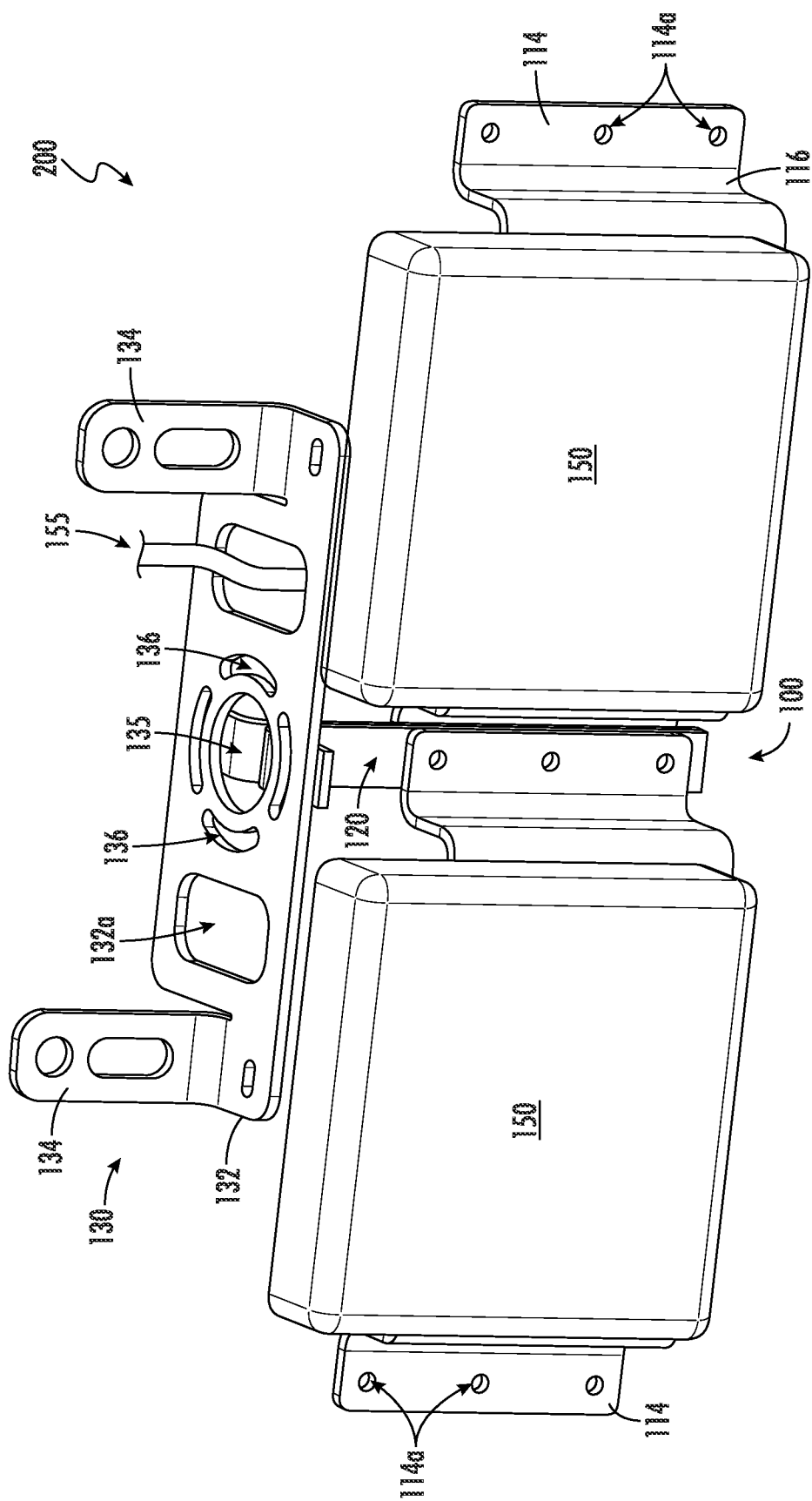
FIG. 7A is a front perspective view of a strand mount assembly according to embodiments of the present invention including the strand mount of FIG. 1 with two antennas mounted thereon.
Figure 7B:
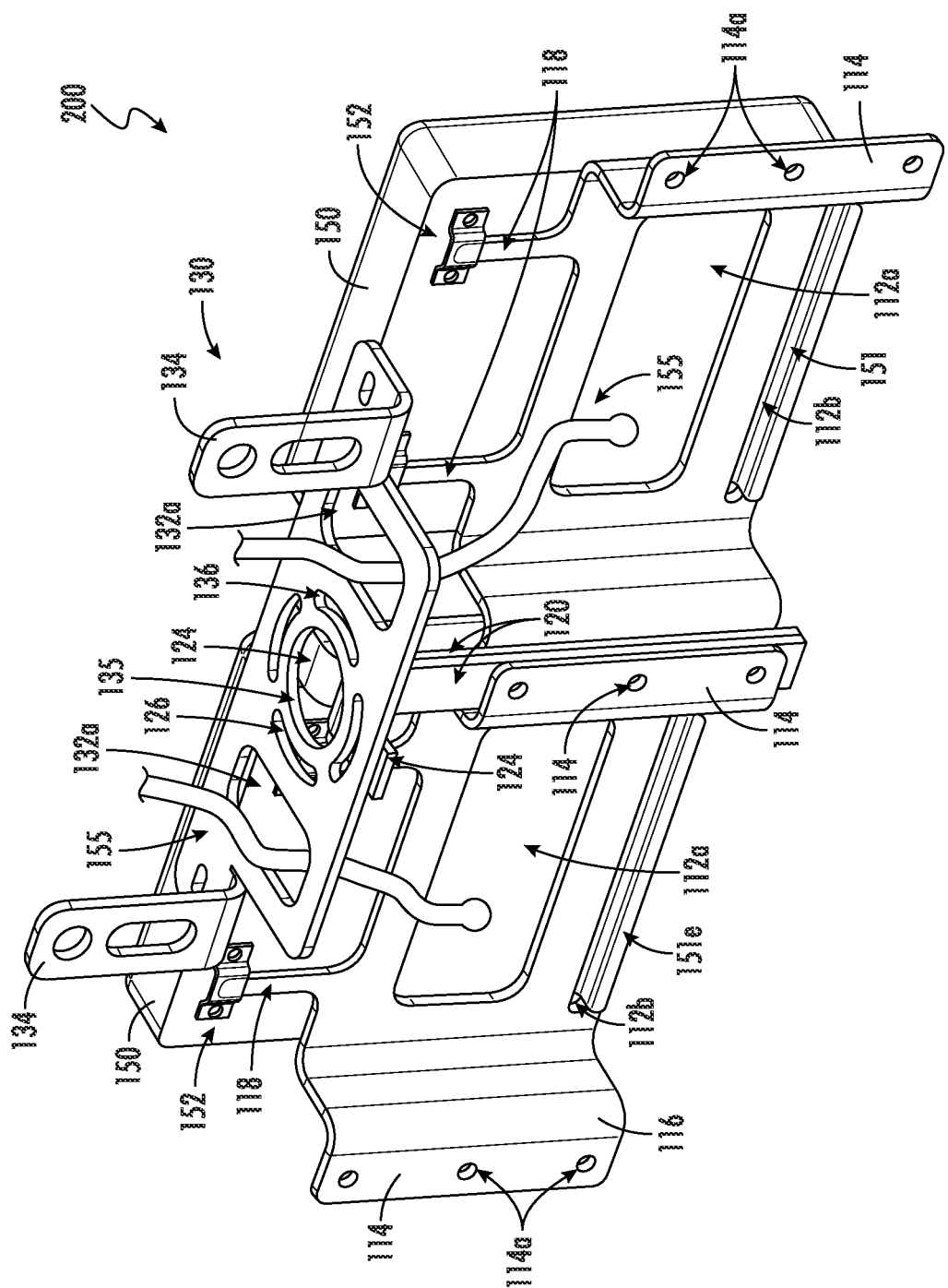
FIG. 7B is a rear perspective view of the strand mount assembly of FIG. 7A.

Referring now to FIGS. 7A-7B, a strand mount assembly 200 according to embodiments of the present invention is illustrated. The strand mount assembly 200 is configured and oriented for directional alignment of antennas 150 mounted to the strand mount 100 (see also, e.g., FIGS. 1-5). As shown in FIGS. 7A-7B, the strand mount 100 of assembly 200 includes two mounting plates 110 which are secured to the hanging bracket 130 via two transition brackets 120. In some embodiments, the two transition brackets 120 may be formed together as a monolithic member. An antenna 150 is secured to each mounting plate 110 via mounting brackets 152 which engage mounting members 118 and flange 151 (with bent edge 151*e*) which is received through slot opening 112*b*. Cables 155 from the antennas 150 may be routed through the openings 112*a* of the mounting plates 110 and through routing apertures 132*a* in the hanging bracket 130.

The transition brackets 120 are positioned back-to-back such that the flanged ends 124 of each bracket 120 extend outwardly in opposite directions (see also, e.g., FIG. 4). The main body 122 of each transition bracket 120 resides between a respective flanged edge 114 of each mounting plate 110 such that the mounting plates 110 (and mounted antennas 150) are oriented to face in the same direction (i.e., the main body 112 of each mounting plate 110 reside generally in the same plane) (see also, e.g., FIG. 4). The mounting plates 110 are secured to the transition brackets 120 via fasteners (not shown) inserted through the aligned apertures 114*a*, 122*a* of the flanged edges 114 of the mounting plates 110 and the main body 122 of the transition brackets 120, respectively. The flanged ends 124 of the transition brackets 120 are secured to the hanging bracket 130 via fasteners (not shown) inserted through respective apertures 124*a* of the transition brackets 120 and corresponding elongated apertures 136 of the hanging bracket 130. Alignment of the apertures 124*a* of the transition brackets 120 may be rotated 360 degrees in relation to the circumferential elongated apertures 136 of the hanging bracket 130 to secure the strand mount 100 with the desired directional alignment of the mounted antennas 150.

Figure 8A:
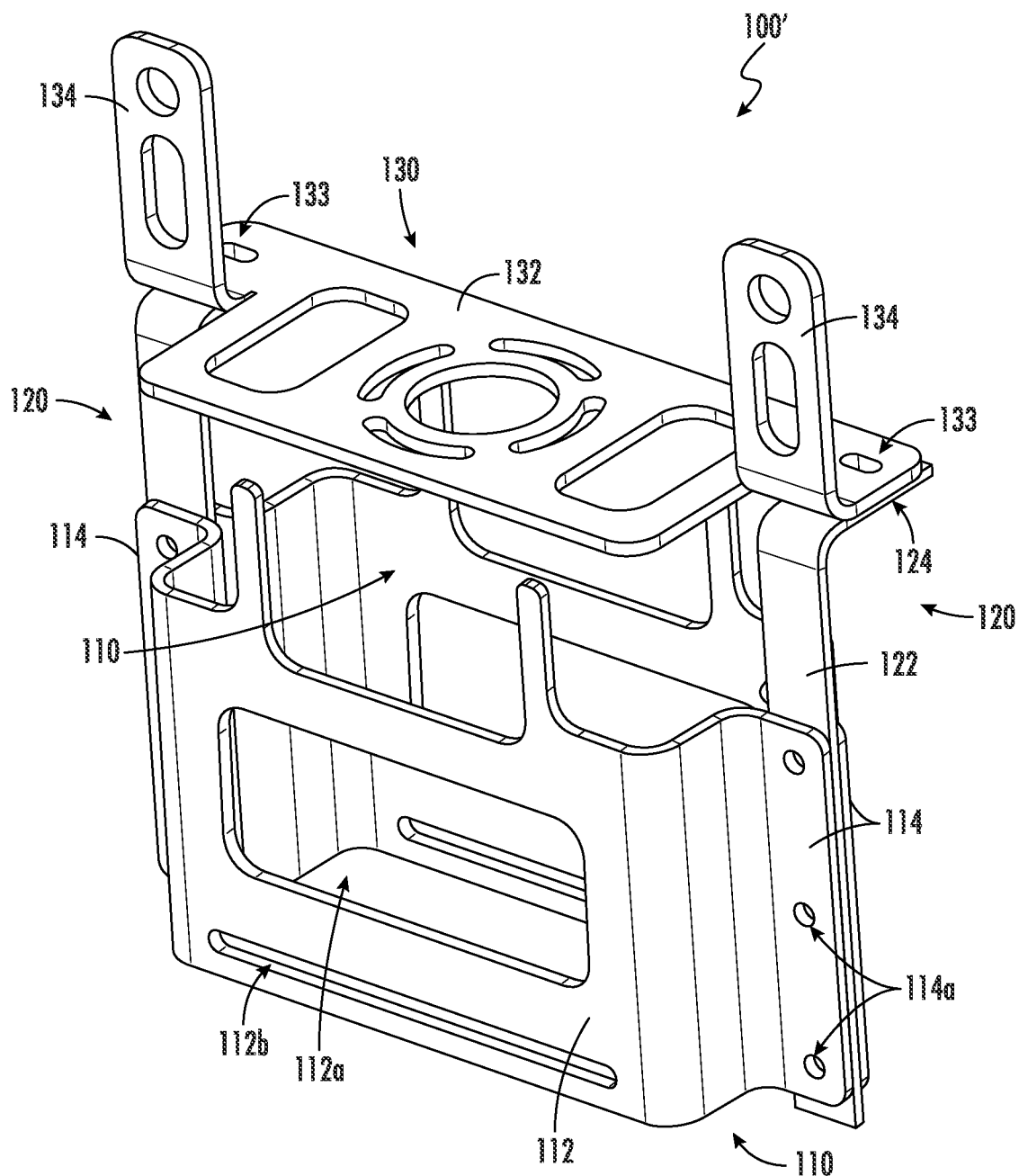
FIG. 8A illustrates an alternative configuration of the strand mount of FIG. 1 according to embodiments of the present invention.
Figure 8B:
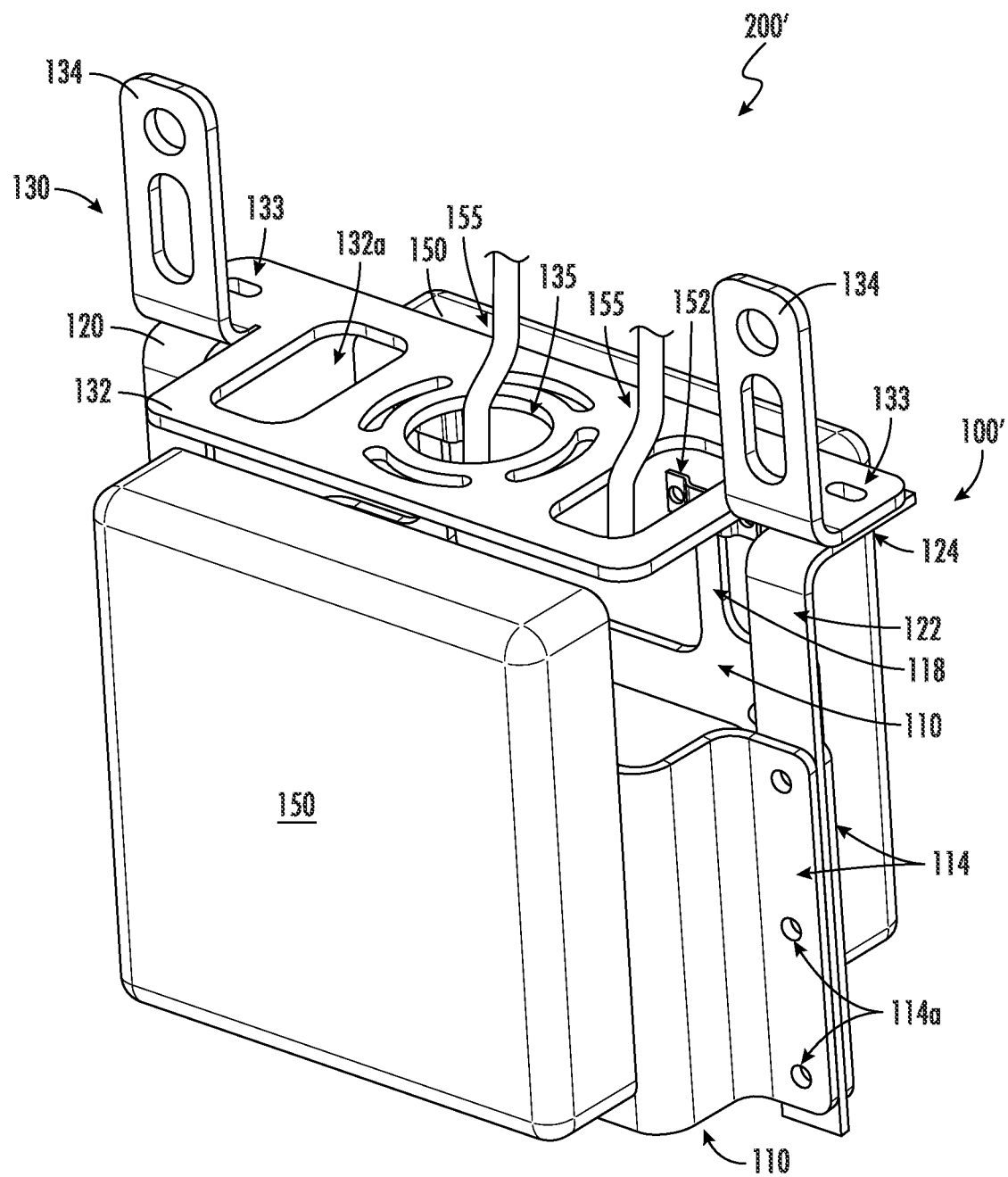
FIG. 8B illustrates a strand mount assembly according to embodiments of the present invention including the strand mount configuration of FIG. 8A with two antennas mounted thereon.

Referring now to FIGS. 8A-8B, an alternative orientation of the strand mount 100 according to embodiments of the present invention, designated broadly as 100', is illustrated. Properties and/or features of the strand mount 100' and/or corresponding strand mount assembly 200' may be as described above in reference to FIGS. 1-7B and duplicate discussion thereof may be omitted herein for purposes of discussing FIGS. 8A-8B.

The strand mount 100' and strand mount assembly 200' may be configured and oriented for omni-directional alignment of antennas 150 mounted to the strand mount 100'. Similar to the strand mount 100 of assembly 200 shown in FIGS. 7A-7B, the strand mount 100' of assembly 200' includes two mounting plates 110 which are secured to the hanging bracket 130 via two transition brackets 120. Strand mount 200' differs from strand mount 200 in that the mounting plates 110 are secured to the hanging bracket 130 via the transition brackets 120 such that the mounting plates 110 are oriented to face in opposite directions. Similar to assembly 200 described herein, antennas 150 are secured to respective mounting plates 110 via mounting brackets 152 which engage mounting members 118 and flange 151 (with bent edge 151*e*) which is received through slot opening 112*b*. Cables 155 from the antennas 150 may be routed through the openings 112*a* of the mounting plates 110 and through routing apertures 132*a* and/or through central aperture 135 in the hanging bracket 130.

The transition brackets 120 are secured to opposing ends 132*e* of the hanging bracket 130. As shown in FIG. 8A, the flanged ends 124 of the transition brackets 120 are secured to the hanging bracket 130 via fasteners (not shown) inserted through respective apertures 124*a* of the transition brackets 120 and corresponding transition apertures 133 of the hanging bracket 130. The main body 122 of each transition bracket 120 resides between a respective flanged edge 114 of each mounting plate 110 such that the mounting plates 110 (and mounted antennas 150) are oriented to face in the opposite direction (i.e., omni-directional alignment of the antennas 150). The mounting plates 110 are secured to the transition brackets 120 via fasteners (not shown) inserted through the aligned apertures 114*a*, 122*a* of the flanged edges 114 of the mounting plates 110 and the main body 122 of the transition brackets 120, respectively.

Figure 9A:
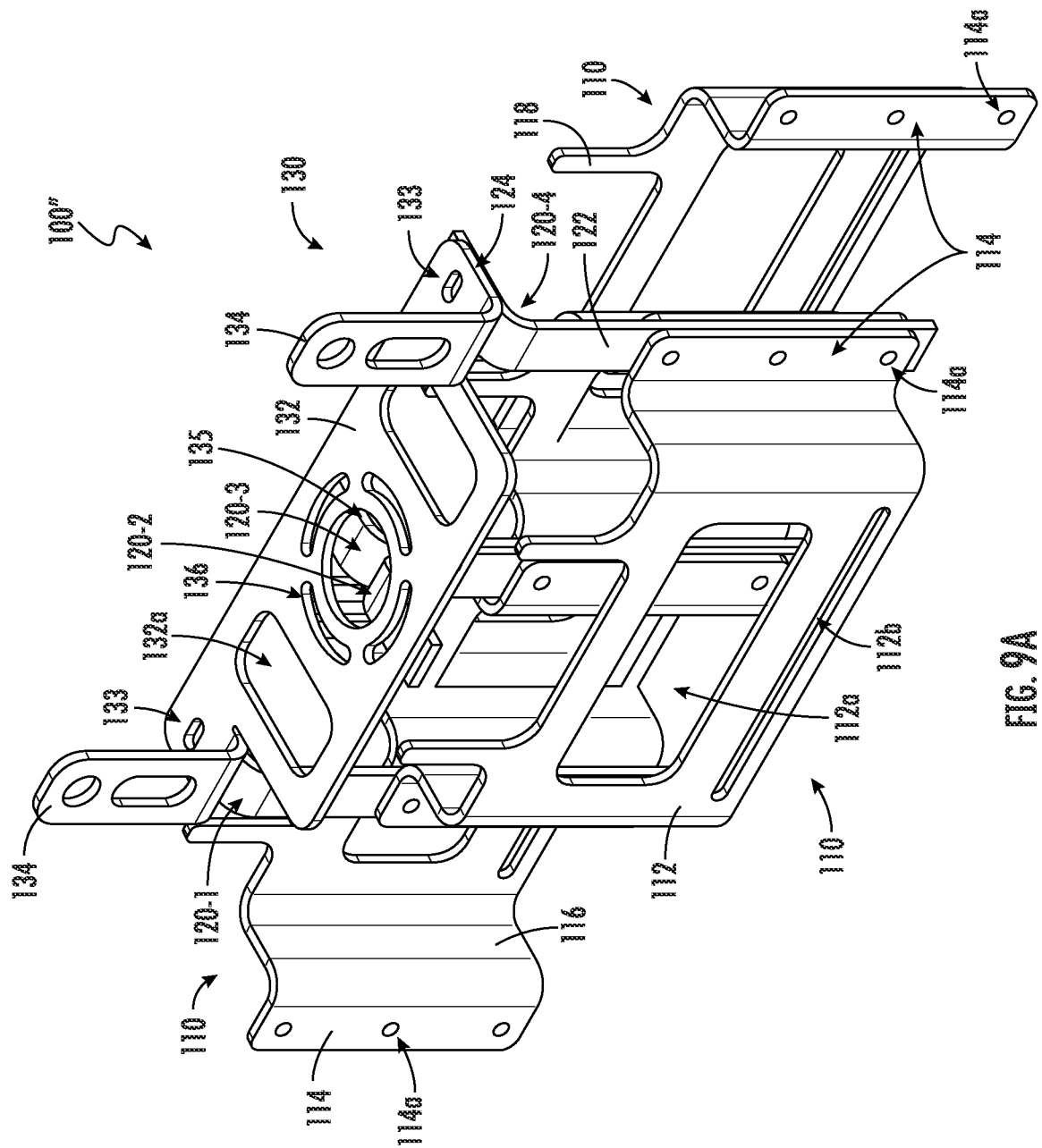
FIG. 9A illustrates an alternative configuration of the strand mount of FIG. 1 according to embodiments of the present invention.
Figure 9B:
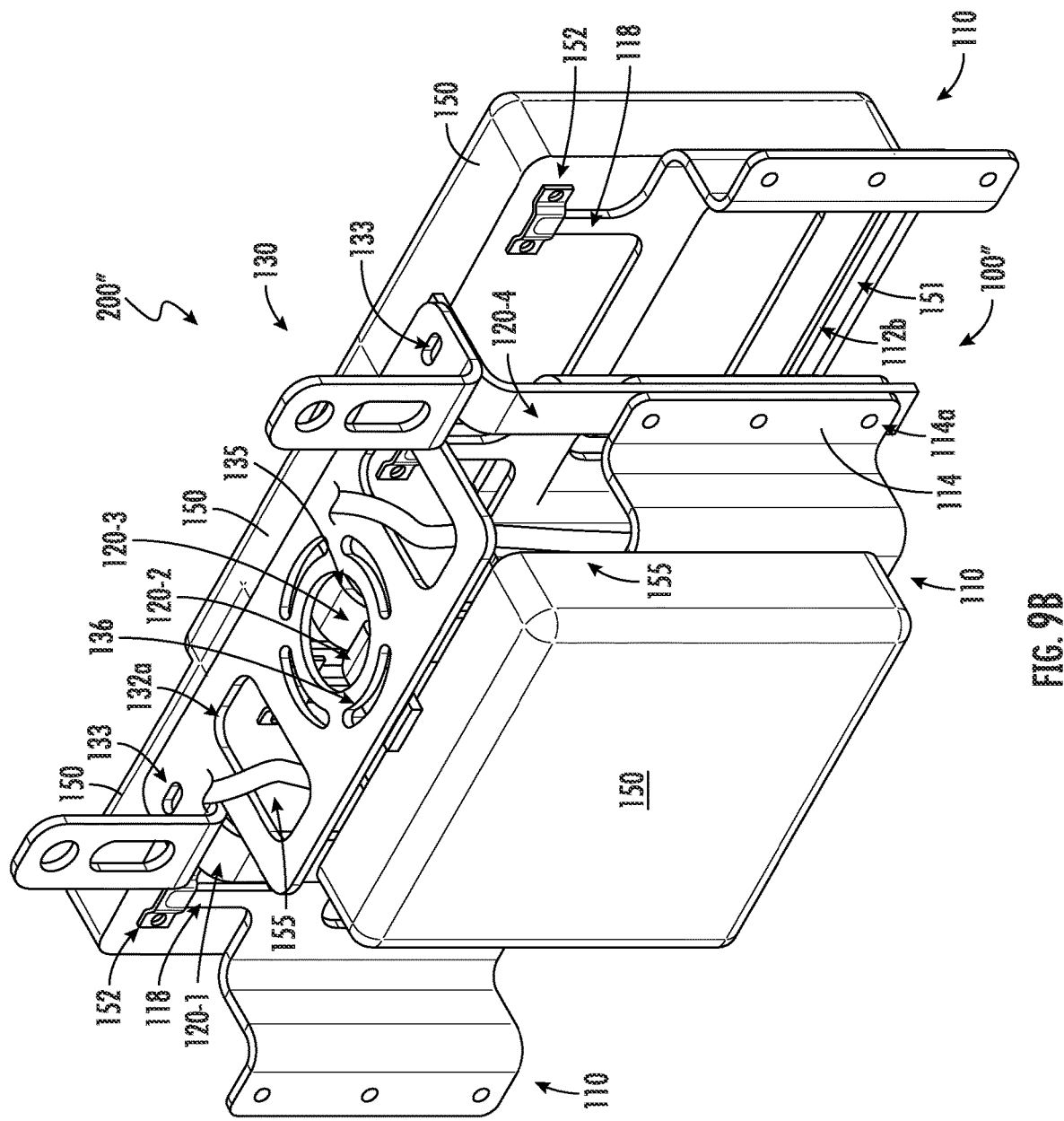
FIG. 9B illustrates a strand mount assembly according to embodiments of the present invention including the strand mount configuration of FIG. 9A with four antennas mounted thereon.
Figure 10B:
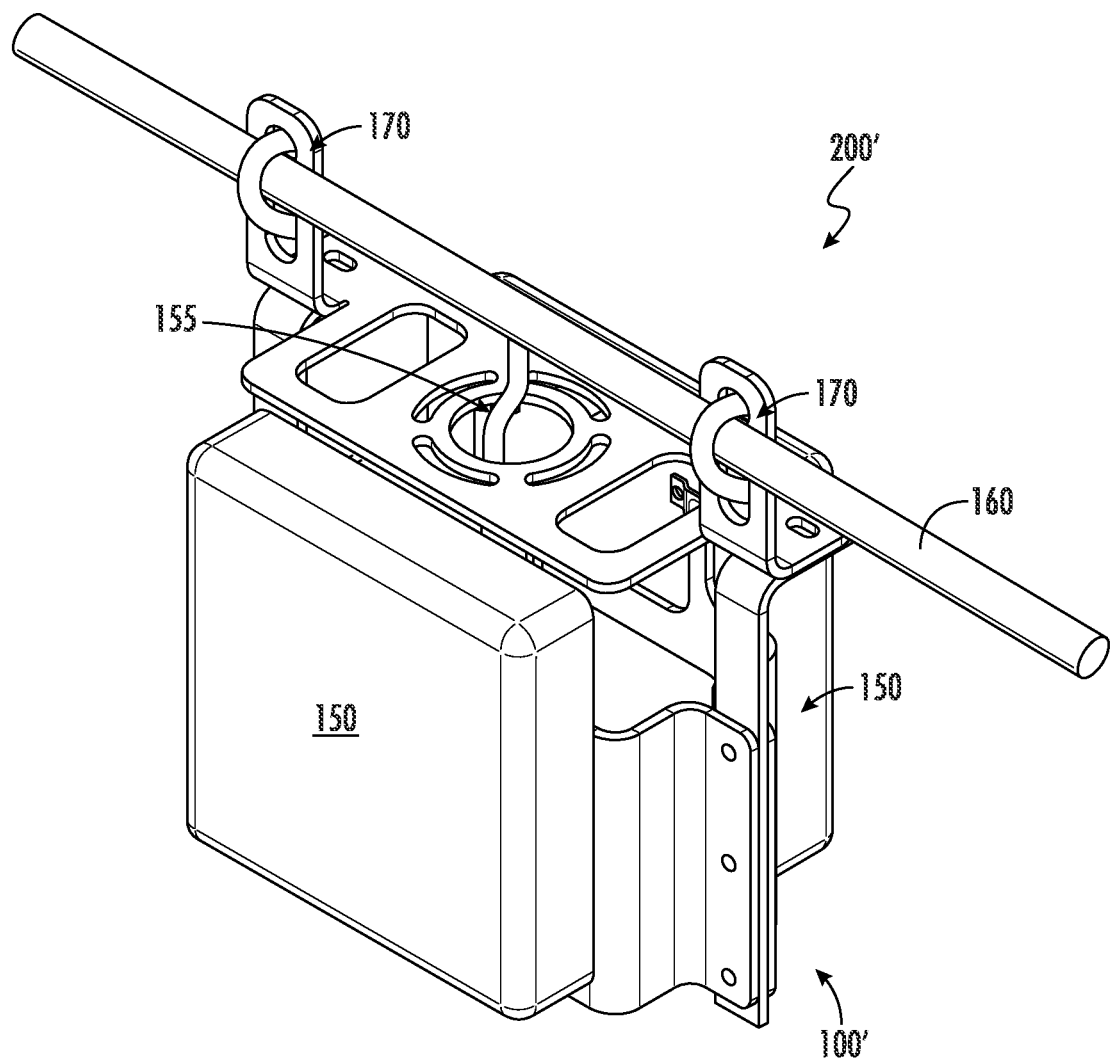

Referring now to FIGS. 9A-9B, an alternative orientation of the strand mount 100, 100' according to embodiments of the present invention, designated broadly as 100", is illustrated. Properties and/or features of the strand mount 100" and/or corresponding strand mount assembly 200" may be as described above in reference to FIGS. 1-8B and duplicate discussion thereof may be omitted herein for purposes of discussing FIGS. 9A-9B.

The strand mount 100" and strand mount assembly 200" may be configured and oriented for directional and/or omni-directional alignment of antennas 150 mounted to the strand mount 100". As shown in FIGS. 9A-9B, in some embodiments, the strand mount 100" (and assembly 200") may include additional mounting plates 110 and transition brackets 120 to accommodate the mounting of additional antennas 150. In essence, the strand mount 100" and assembly 200" combine the configurations of strand mount 100 and strand mount 100' described herein.

In some embodiments, the strand mount 100" includes four mounting plates 110, four transition brackets 120, and a hanging bracket 130. In some embodiments, three of the mounting plates 110 may be formed together as a monolithic member with the other mounting plate 110 oriented to face in the opposite direction of the monolithic member. Two of the transition brackets 120 (i.e., 120-2 and 120-3) are positioned back-to-back such that the flanged ends 124 of each bracket 120 extend outwardly in opposite directions. Similar to the strand mount 100 and strand mount assembly 200 described herein, the flanged ends 124 of the transition brackets 120-2, 120-3 are secured to the hanging bracket 130 via fasteners (not shown) inserted through respective apertures 124*a* of the transition brackets 120 and corresponding elongated apertures 136 of the hanging bracket 130. The other two transition brackets 120 (i.e., 120-1 and 120-4) are positioned similar to the strand mount 100' and strand mount assembly 200' with the transition brackets 120-1, 120-4 being secured to opposing ends 132*e* of the hanging bracket 130 via fasteners (not shown) inserted through respective apertures 124*a* of the transition brackets 120 and corresponding transition apertures 133 of the hanging bracket 130.

As shown in FIG. 9B, up to four antennas 150 may be secured to the strand mount 100" which may be configured for directional and/or omni-directional mounting of the antennas 150. In some embodiments, to allow for 360 degree rotation in directional modes, the two transition brackets 120-1, 120-4 may not be secured to the hanging bracket 130 via transition apertures 133. Instead, these transition brackets 120-1, 120-4 are only secured between respective flanged edges 114 of the mounting plates 110. Thus, the mounting plates 110 are only secured to the hanging bracket 130 via transition bracket 120-2, 120-3 which allows orientation of the strand mount 100" to be rotated by aligning the apertures 124*a* of the transition brackets 120-2, 120-3 in relation to the circumferential elongated apertures 136 of the hanging bracket 130 to secure the strand mount 100 with the desired directional alignment of the mounted antennas 150.

Similar to assemblies 200, 200' described herein, antennas 150 are secured to respective mounting plates 110 via mounting brackets 152 which engage mounting members 118 and flange 151 (with bent edge 151e) which is received through slot opening 112b. Cables 155 from the antennas 150 may be routed through the openings 112a of the mounting plates 110 and through routing apertures 132a in the hanging bracket 130.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A strand mount, comprising:
   a hanging bracket configured to be secured to a cable strand;
   two or more mounting plates, each mounting plate configured such that a small cell antenna can be mounted thereto; and
   two or more transition brackets securing the two or more mounting plates directly to the hanging bracket,
   wherein at least two of the two or more transition brackets are configured to be positioned back-to-back to each other such that the mounting plates secured thereto can be oriented to face in the same direction to allow for directional mounting of the small cell antennas to the strand mount and are configured to be positioned spaced apart from each other such that the mounting plates secured thereto can be oriented to face in opposing directions to allow for omni-directional mounting of the small cell antennas to the strand mount.

2. The strand mount of claim 1, wherein each mounting plate comprises:
   a main body;
   a pair of flanged edges that extend outwardly from opposing sides of the main body, wherein each flanged edge comprises one or more apertures sized and configured to receive a respective fastener such that the mounting plate can be secured to one or more of the transition brackets; and
   a pair of mounting members that extend upwardly from the main body and configured to have a respective small cell antenna secured thereto.

3. The strand mount of claim 2, wherein the main body of each mounting plate comprises one or more openings sized and configured to allow access to the back of a mounted antenna and cables to be routed therefrom.

4. The strand mount of claim 3, wherein one of the openings in the main body of each mounting plate is an elongated slot sized and configured to receive a flange extending outwardly from the back of a mounted antenna.

5. The strand mount of claim 1, wherein each transition bracket comprises:
   a main body comprises one or more apertures positioned and configured to align with a corresponding aperture in the flanged edge of the mounting plate; and
   a flanged end coupled to and extending generally perpendicularly to the main body, the flanged end comprising an aperture configured to align with a corresponding aperture in the hanging bracket.

6. The strand mount of claim 1, wherein the hanging bracket comprises:
   a main body having a plurality of apertures, wherein the plurality of apertures includes a plurality of elongated slots extending circumferentially around a central aperture and being positioned and configured to align with a corresponding aperture in the flanged end of the transition bracket; and
   a pair of arm members comprising one or more apertures configured to secure the strand mount to a cable strand, each arm member residing adjacent to opposing ends of the main body and bent perpendicularly to, and extending upwardly from, the main body,
   wherein alignment of the apertures in the flanged ends of the transition brackets within respective elongated slots allows the small cell antennas to be directional mounted 360 degrees.

7. The strand mount of claim 6, wherein the plurality of apertures in the main body of the hanging bracket includes transition apertures located adjacent to opposing edges of the main body and rearwardly from a respective arm member, wherein each transition aperture is configured to align with a corresponding aperture in the flanged end of the transition bracket to allow for omni-directional mounting of the small cell antennas.

8. The strand mount of claim 1, wherein small cell antennas are mounted to respective mounting plates, and wherein the transition brackets are secured to the hanging bracket via fasteners received through the elongated slots such that the small cell antennas are positioned to face outwardly in the same direction.

9. The strand mount of claim 1, wherein small cell antennas are mounted to respective mounting plates, and wherein the transition brackets are secured to the hanging bracket via fasteners received through the transition apertures such that the small cell antennas are positioned to face outwardly in opposite directions.

10. A strand mount, comprising:
   (a) a hanging bracket, the hanging bracket comprising:
      a main body having a plurality of apertures, wherein the plurality of apertures includes a plurality of elongated slots extending circumferentially around a central aperture and two transition apertures residing at opposing ends of the main body; and
      a pair of arm members configured to secure the strand mount to a cable strand, each arm member residing adjacent to opposing ends of the main body and bent perpendicularly to, and extending upwardly from, the main body;
   (b) two or more mounting plates, each mounting plate comprising:
      a main body;
      a pair of flanged edges that extend outwardly from opposing sides of the main body; and
      a pair of mounting members that extend upwardly from the main body and configured to have a respective small cell antenna secured thereto; and
   (c) two or more transition brackets configured to secure the mounting plates directly to the hanging bracket, wherein each transition bracket comprises:
      a main body having one or more apertures positioned and configured to align with a corresponding aperture in a respective flanged edge of the mounting plate; and
      a flanged end coupled to and extending generally perpendicularly to the main body, the flanged end comprising an aperture configured to align with a respective elongated slot in the hanging bracket, wherein the transition brackets are configured to be secured to the hanging bracket via the plurality of elongated slots to allow for directional mounting of the small cell antennas to the strand mount and configured to be secured to the hanging bracket via the transition apertures to allow for omni-directional mounting of the small cell antennas to the strand mount.

11. The strand mount of claim 10, wherein the main body of each mounting plate comprises one or more openings sized and configured to allow access to the back of a mounted antenna and cables to be routed therefrom.

12. The strand mount of claim 11, wherein one of the openings in the main body of each mounting plate is an elongated slot sized and configured to receive a flange extending outwardly from the back of a mounted antenna.

13. The strand mount of claim 10, wherein the plurality of apertures in the main body of the hanging bracket includes transition apertures located adjacent to opposing edges of the main body and rearwardly from a respective arm member, wherein each transition aperture is configured to align with a corresponding aperture in the flanged end of the transition bracket to allow for omni-directional mounting of the small cell antennas.

14. The strand mount of claim 10, wherein small cell antennas are mounted to respective mounting plates, and wherein the transition brackets are secured to the hanging bracket such that the small cell antennas are positioned to face outwardly in the same direction.

15. The strand mount of claim 10, wherein small cell antennas are mounted to respective mounting plates, and wherein the transition brackets are secured to the hanging bracket such that the small cell antennas are positioned to face outwardly in opposite directions.

16. A strand mount assembly, comprising:
a mounting structure, wherein the mounting structure is a cable strand;
one or more small cell antennas; and
a strand mount, the strand mount comprising:
a hanging bracket configured to be secured to the cable strand;
two or more mounting plates, each mounting plate configured such that a respective small cell antenna can be mounted thereto; and
two or more transition brackets securing the two or more mounting plates directly to the hanging bracket, wherein each of the small cell antennas are mounted to a respective mounting plate and the strand mount is mounted to the cable strand by the hanging bracket, and wherein the hanging bracket and each mounting plate has one or more openings configured such cables from the one or more small cell antennas can be routed therethrough.

17. The strand mount assembly of claim 16, wherein at least one of the mounting plates is secured to the hanging bracket via the transition brackets and oriented to face in the opposite direction of another mounting plate to provide omni-directional alignment of the small cell antennas mounted thereto.

18. The strand mount assembly of claim 17, wherein each mounting plate is secured to the hanging bracket via the transition brackets and oriented to face in the same direction to provide directional alignment of the small cell antennas mounted thereto.

19. The strand mount assembly of claim 16, wherein each transition bracket comprises at least one aperture in a flanged end and the hanging bracket comprises a plurality of elongated slots extending circumferentially around a central aperture, wherein alignment of the apertures in the flanged ends of the transition brackets within the elongated slots allows the small cell antennas to be directional mounted 360 degrees.

20. A strand mount, comprising:
a hanging bracket configured to be secured to a cable strand;
two or more mounting plates, each mounting plate comprising a main body and a pair of flanged edges that extend outwardly from opposing sides of the main body, wherein the main body resides on a first plane and the pair of flanged edges reside on a second plane that is parallel to, and offset from, the first plane; and
two or more transition brackets securing the two or more mounting plates to the hanging bracket, each transition bracket being secured to the flanged edge of one or more of the mounting plates, wherein each mounting plate is configured such that a small cell antenna can be mounted thereto, and wherein the transition brackets and mounting plates are adjustable to allow for directional and/or omni-directional mounting of the small cell antennas to the strand mount.

* * * * *

UNITED STATES PATENT AND TRADEMARK OFFICE
CERTIFICATE OF CORRECTION

PATENT NO. : 11,824,252 B2
APPLICATION NO. : 17/582481
DATED : November 21, 2023
INVENTOR(S) : Campbell et al.

It is certified that error appears in the above-identified patent and that said Letters Patent is hereby corrected as shown below:

In the Claims

Column 12, Line 5, Claim 16: Please correct "one or more openings configured such cables from the" to read --one or more openings configured such that cables from the--

Signed and Sealed this
Thirteenth Day of February, 2024

Katherine Kelly Vidal
*Director of the United States Patent and Trademark Office*